United States Patent

Uchida et al.

[11] Patent Number: 6,087,431
[45] Date of Patent: Jul. 11, 2000

[54] OLEFINIC THERMOPLASTIC ELASTOMER COMPOSITION

[75] Inventors: Kensuke Uchida; Shinichi Shibayama, both of Kawasaki, Japan

[73] Assignee: Asahi Kasei Kagyo Kabushiki Kaisha, Osaka, Japan

[21] Appl. No.: 09/202,371

[22] PCT Filed: Apr. 14, 1998

[86] PCT No.: PCT/JP98/01696

§ 371 Date: Dec. 11, 1998

§ 102(e) Date: Dec. 11, 1998

[87] PCT Pub. No.: WO98/46675

PCT Pub. Date: Oct. 22, 1998

[30] Foreign Application Priority Data

Apr. 14, 1997 [JP] Japan ................................. 9-095965

[51] Int. Cl.$^7$ .................................................. C08K 5/01
[52] U.S. Cl. ........................................ 524/490; 524/491
[58] Field of Search ................................. 524/484, 485, 524/486, 490, 491

[56] References Cited

U.S. PATENT DOCUMENTS

| 4,212,787 | 7/1980 | Matsuda | 260/33.6 |
| 4,440,911 | 4/1984 | Inoue | 525/301 |
| 5,391,629 | 2/1995 | Turner | 525/268 |
| 5,520,975 | 5/1996 | Inoue | 428/35.9 |

FOREIGN PATENT DOCUMENTS

| 8-120127 | 5/1996 | Japan . |
| 9-104787 | 4/1997 | Japan . |
| 9-137001 | 5/1997 | Japan . |
| 9-302156 | 11/1997 | Japan . |
| 10-45966 | 2/1998 | Japan . |

*Primary Examiner*—Paul R. Michl
*Attorney, Agent, or Firm*—Pennie & Edmonds LLP

[57] ABSTRACT

An olefinic thermoplastic elastomer composition, which comprises a mixture comprising:

(1) 100 parts by weight of an olefinic elastomer comprising ethylene and at least one α-olefin having 6 to 12 carbon atoms, and having an α-olefin copolymerization ratio of 20 to 30% by weight, a density of 0.8 to 0.9 g/cm$^3$ and a molecular weight distribution (Mw/Mn) of less than 3.0 in terms of a ratio of weight-average molecular weight (Mw) to number-average molecular weight (Mn) calculated by gel permeation chromatography (GPC), (2) 5 to 90 parts by weight of a propylenic polymer, and (3) 5 to 250 parts by weight of an oil for rubber, the mixture being crosslinked by a radical initiator or both of a radical initiator and a crosslinking promoter.

13 Claims, No Drawings

OLEFINIC THERMOPLASTIC ELASTOMER COMPOSITION

TECHNICAL FIELD

The present invention relates to an olefinic thermoplastic elastomer composition comprising a specific olefinic elastomer.

BACKGROUND ART

Thermoplastic elastomer compositions produced by so called dynamic crosslinking, i.e. crosslinking of a radical crosslinkable, olefinic elastomer with a non-radical crosslinkable olefinic resin such as polypropylene (PP), etc. in the presence of a radical initiator, while melt-kneading them through an extruder belongs to the well known art and have been already widely used in automobile parts, etc.

For the thermoplastic elastomer compositions, ethylene-propylene-diene rubber (EPDM) has been so far used as an olefinic elastomer, where the diene component in the polymer chain is necessary for improving the crosslinkability, but the elastomer is not satisfactory yet with respect to the environment-caused deterioration resistance due to the diene component and their quality improvement has been keenly desired.

JP-A-8-120127 and JP-A-9-137001 disclose the art of using olefinic elastomers produced in the presence of a metallocene catalyst, but the elastomers are not satisfactory yet with respect to the quality and improvement of its quality has been desired.

An object of the present invention is to improve the processability and the environment-caused deterioration resistance, which have been problems of the conventional olefinic elastomers, and to provide an olefinic thermoplastic elastomer composition having distinguished mechanical characteristics, particularly a composition capable of having a low hardness and substantially free from such problems as oil bleed, etc.

DISCLOSURE OF THE INVENTION

Many attempts have been recently made to develop various polymers by a metallocene catalyst. The present inventors have found that olefinic elastomers having a specific structure of ethylene and α-olefin produced by a metallocene catalyst have a much, distinguished radical crosslinkability and can solve all of the above-mentioned problems and thus have accomplished the present invention.

That is, the present invention provides an olefinic thermoplastic elastomer composition, which comprises a mixture comprising:

(1) 100 parts by weight of an olefinic elastomer comprising ethylene and at least one α-olefin having 6 to 12 carbon atoms, and having an α-olefin copolymerization ratio of 26 to 30% by weight, a density of 0.8 to 0.9 g/cm$^3$ and a molecular weight distribution (Mw/Mn) of less than 3.0 in terms of a ratio of weight-average molecular weight (Mw) to number-average molecular weight (Mn) calculated by gel permeation chromatography (GPC), (2) 5 to 90 parts by weight of a propylenic polymer, and (3) 5 to 250 parts by weight of an oil for rubber, the mixture being crosslinked by a radical initiator or both of a radical initiator and a crosslinking promoter.

BEST MODE FOR CARRYING OUT THE INVENTION

Olefinic elastomer

The olefinic elastomer as the main component of the present thermoplastic elastomer composition is a copolymer comprising ethylene and at least one α-olefin having 6 to 12 carbon atoms and have a specific copolymerization ratio, a specific density and a specific molecular weight distribution.

α-Olefins having 6 to 12 carbon atoms include, for example, hexene-1, 4-methylpentane-1, heptene-1, octene-1, nonene-1, decene-1, undecene-1, dodecane-1, etc., among which hexene-1, 4-methylpentene-1 and octene-1 are preferable, and octene-1 is particularly preferable. Even a small amount of octene-1 has a distinguished effect of softening the polymer, and also the resulting copolymers have a distinguished mechanical strength.

The olefinic elastomers for use in the present invention are produced preferably by a well known metallocene catalyst.

Metallocene catalyst comprises a cyclopentadienyl derivative of Group IV metals such as titanium, zirconium, etc. and a promoter and is characterized not only by a high activity as a polymerization catalyst, but also by a narrower molecular weight distribution of the resulting polymers and more uniform distribution of α-olefins having 6 to 12 carbon atoms as a comonomer of the copolymers than those of polymers obtained by the conventional catalyst, for example, a Ziegler catalyst.

That is, the olefinic elastomers produced by a metallocene catalyst are quite different in the polymer properties from the conventional polymers produced by a Ziegler catalyst, etc.

Characteristics of the olefinic elastomers comprising ethylene and an α-olefin produced by a metallocene catalyst are as follows:

1. Higher activity of the polymerization catalyst can much more increase the α-olefin proportion of the comonomer than the conventional proportion, and thus can produce elastomeric polymers having a good flexibility even in the absence of a plasticizer.
2. Comonomer distribution is more uniform than the Ziegler-based polymers.
3. Molecular weight distribution is very sharp, and the low molecular weight component is much less with distinguished mechanical strength and processability and a high quality, as compared with the Ziegler-based polymers.
4. In spite of the sharp molecular weight distribution, a higher ratio (I10/I2) of melt index (I10) at 190° C./10 kgf to melt index (I2) at 190° C./2.16 kgf set forth according to ASTM D1238 can be obtained, when a long chain branch is introduced, and processing characteristics are excellent.
5. No diene component is involved, and the environment-caused deterioration resistance is excellent.
6. Even in a higher copolymerization ratio of α-olefin, no substantial blocking occurs and the pellet form can be obtained.

In case of olefinic elastomers as copolymers of ethylene and α-olefin produced by a Ziegler catalyst, the melt index ratio (I10/I2) and the molecular weight distribution take substantially linear proportions, and the molecular weight distribution tends to increase with increasing melt index ratio. The molecular weight distribution (Mw/Mn) is about 3 to about 10.

Olefinic polymers produced by a metallocene catalyst, on the other hand, have a sharp molecular weight distribution (Mw/Mn) of less than 3.0, irrespective of the melt index ratio, with much less low molecular weight component. Thus, much distinguished processability can be obtained.

The molecular weight distribution (Mw/Mn) of the olefinic elastomer can be calculated by GPC. GPC apparatuses and procedures for determination are not limited, but the present inventors used the following apparatus and method for determination in the following Examples and Comparative Examples:

Apparatus: 150C GPC made by Waters Co., Ltd.
Column: one Shodex AT-807S column and two Toso TSK-GEL GMH-H6 columns, i.e. total 3 columns.
Solvent: 1, 2, 4-trichlorobenzene
Measurement temperature: 140° C.
Standard substance: polystyrene The olefinic elastomer for use in the present invention has an α-olefin copolymerization ratio of 26 to 30% by weight, where a low elastomer hardness and a high oil retainability can be obtained, and thus a less oil-bleedable composition can be obtained. When the α-olefin copolymerization ratio is less than 26% by weight, the copolymer will have a higher hardness, so that a composition having a low hardness is hard to obtain, resulting in an insufficient oil retainability and a high oil bleed occurrence. When the α-olefin copolymerization ratio exceeds 30% by weight on the other hand, the mechanical strength of copolymer will largely decrease and, undesirably, the tensile strength, etc. of the resulting composition will largely decrease.

By use of such elastomers, a flexible thermoplastic elastomer composition having a surface hardness Type A of not more than 90, as set forth according to ASTM D2240, can be obtained.

The density of the olefinic elastomer for use in the present invention is in a range of 0.8 to 0.9 g/cm³. By use of an olefinic elastomer having such a density range, a thermoplastic elastomer composition having a distinguished flexibility and a low hardness can be obtained.

It is more preferable that particularly when the following relation (a) can be established between the copolymerization ratio (c) (% by weight) and the density d (g/cm³) of the olefinic elastomer:

$$0.0026 \times c + 0.9200 \leq d \leq -0.0026 \times c + 0.9400 \quad (a)$$

a distinguished balance of physical property can be obtained between the mechanical strength and hardness of the elastomer. When the density d is less than that range, the mechanical strength will be unsatisfactory, whereas when the density d is higher than that range, an oil bleed is undesirably more liable to occur.

It is desirable that the olefinic elastomer for use in the present invention has a long chain branch. The presence of a long chain branch can make the density much lower without any decrease in the mechanical strength, according to the α-olefin copolymerization ratio (% by weight), and thus elastomers having a low density, a low hardness and a high strength can be obtained. Olefinic elastomers having a long chain branch are disclosed in U.S. Pat. No. 5,278,272, etc.

It is also desirable that the olefinic elastomers have a DSC melting point peak at a temperature not lower than room temperature. Owing to such a melting peak, a stable morphology can be obtained together with easy handling and less stickiness in a temperature range of less than the melting point.

Furthermore, the olefinic elastomer for use in the present invention has a melt index in a range of preferably 0.01 to 100 g/10 minutes (load: 2.16 kg at 190° C.), more preferably 0.2 to 20 g/10 minutes (load: 2.16 kg at 190° C.).

When the melt index exceeds 100 g/10 minutes, the thermoplastic elastomer composition will has an insufficient crosslinkability, whereas it is less than 0.01 g/10 minutes the flowability and the processability will be undesirably deteriorated.

The olefinic elastomers having the abovementioned specific structure have a surprisingly distinguished radical crosslinkability, which is equivalent to that of the conventional EPDM and can serve as optimum polymers for the crosslinkable elastomer component of thermoplastic elastomer composition to be produced by dynamic crosslinking. Dynamic crosslinking is a processing procedure for crosslinking reaction in a kneader for a short time, where copolymerization is desirably carried out for a crosslinking time (Tc 90) of not more than 400 seconds, preferably not more than 300 seconds, more preferably not more than 200 seconds as an indicator of crosslinking speed.

Crosslinking time (Tc 90) is the time until 90% of the maximum degree of crosslinking (viscosity) can be obtained when vulcanization characteristics are measured at 170° C. by a rheometer for 100 parts by weight of the elastomer admixed with 1.0 part by weight of dicumyl peroxide. Particularly, an elastomer having a copolymerization ratio of 26 to 30% by weight, which comprises octene-1 as an α-olefin, has a crosslinking time (Tc 90) of not more than 200 seconds and thus is preferable.

When the loss tangent t (23° C.) of dynamic viscoelastic characteristics of olefinic elastomers satisfies the following relation (b), the rubber characteristics such as an impact resilience., etc. can be much improved, and the rubber characteristics such as a compression set, an impact resilience, etc. of the resulting composition will be desirably better:

$$0.03 \leq t \leq 0.08 \quad (b)$$

Particularly, an elastomer having a copolymerization ratio of 26 to 30% by weight, which comprises octene-1 as an α-olefin, has a loss tangent t in the abovementioned range, and can serve as an elastomer having a distinguished impact resilience.

Dynamic viscoelasticity is measured in the following method:

Dynamic viscoelasticity meter: RSA-II made by Rheometrics Co., Ltd.
Measurement mode: Stretching
Frequency for the measurement: 11 Hz
Temperature-elevation ratio: 2° C./min.
Dynamic strain: 0.1%

On the basis of loss tangent t (tan δ) at 23° C. upon measurement under the above conditions, determination is made according to the above relation (b).

The olefinic elastomers for use in the present invention can be used in a mixture of two or more to further improve the processability.

Olefinic elastomers comprising ethylene and at least one α-olefin having 1 to 12 carbon atoms, produced by a metallocene catalyst, are known under the trade names such as "Engage" of DuPont-Dow elastomers Co., Ltd.

Propylenic Polymer

Propylenic copolymers for use in the present invention include, for example, homo isotactic polypropylene, isotactic copolymers (including block and random copolymers) of propylene and other α-olefins such as ethylene, butene-1, pentene-1, hexene-1, etc.

At least one copolymer selected from these polymers can be used in a ratio of 5 to 90 parts by weight, preferably 20 to 80 parts by weight, per 100 parts by weight of the olefinic elastomer. Below 5 parts by weight, the flowability and processability of the composition will be undesirably lowered, whereas above 90 parts by weight the flexibility of the composition will be undesirably insufficient.

The melt index of the propylenic polymer for use in the present invention is preferably in a range of 0.1 to 100 g/10 minutes (load: 2.16 kg at 230° C.). Above 100 g/10 minutes, the heat resistance and mechanical strength of the thermoplastic elastomer composition will be undesirably insufficient whereas below 0.1 g/10 minutes the flowability and molding processability will be undesirably lowered.

Oil for rubber

Oil for rubber for use in the present invention is preferably paraffinic and naphthenic process oils or the like. To adjust the hardness and flexibility of the composition, the oil for rubber is used in a ratio of 5 to 250 parts by weight, preferably 10 to 150 parts by weight, per 100 parts by weight of the olefinic elastomer. Below 5 parts by weight the flexibility and processability will be undesirably insufficient, whereas above 250 parts by weight the oil bleed will be undesirably considerable.

By combination of the specific olefinic elastomer, propylenic polymer and oil for rubber in a specific ratio, as described above, the present thermoplastic elastomer composition can have an improved balance between the mechanical strength and the flexibility or the processability and thus can be used preferably in the fields of automobile parts, etc.

It is necessary that a mixture comprising the olefinic elastomer, propylenic polymer and oil for rubber of the present invention is crosslinked by a radical initiator such as organic peroxides, etc. or both radical initiator and crosslinking promoter, whereby the abrasion resistance, or the mechanical strength, heat resistance, etc. can be further improved.

Preferable radical initiators for this purpose include, for example, peroxyketals such as 1,1-bis(t-butylperoxy)-3,3,5-trimethylcyclohexane, 1,1-bis(t-hexylperoxy)-3,3,5-trimethylcyclohexane, 1,1-bis(t-hexylperoxy)cyclohexane, 1,'-bis(t-butylperoxy)cyclododecane, 1,1-bis(t-butylperoxy) cyclohexane, 2,2-bis(t-butylperoxy)octane, n-butyl-4,4-bis (t-butylperoxy)butane, n-butyl-4,4-bis(t-butylperoxy) valerate, etc.; dialkyl peroxides such as di-t-butyl peroxide, dicumyl peroxide, t-butylcumyl peroxide, α,α'-bis(t-butylperoxy-m-isopropyl)benzene, α,α'-bis(t-butylperoxy) diisopropylbenzene, 2,5-dimethyl-2,5-bis(t-butylperoxy) hexane, 2,5-dimethyl-2,5-bis(t-butylperoxy)-hexyne-3, etc.; diacyl peroxides such as acetyl peroxide, isobutyryl peroxide, octanoyl peroxide, decanoyl peroxide, lauroyl peroxide, 3,5,5-trimethylhexanoyl peroxide, benzoyl peroxide, 2,4-dichlorobenzoyl peroxide, m-tolyoyl peroxide, etc.; peroxyesters such as t-butyl peroxyacetate, t-butyl peroxyisobutyrate, t-butylperoxy-2-ethyl hexanoate, t-butyl peroxylaurylate, t-butyl peroxybenzoate, di-t-butyl peroxyisophthalate, 2,5-dimethyl-2,5-di(benzoylperoxy) hexane, t-butyl peroxymaleate, t-butyl peroxyisoproylcarbonate, cumyl peroxyoctate, etc.; hydroperoxides such as t-butyl hydroperoxide, cumene hydroperoxide, diisopropylbenzene hydroperoxide, 2,5-dimethylhexane-2,5-dihydroperoxide, 1,1,3,3-tetramethylbutyl peroxide, etc.

Among these compounds, 1,1-bis(t-butylperoxy)-3,3,5-trimethylcyclohexane, di-t-butyl peroxide, dicumyl peroxide, 2,5-dimethyl-2,5-bis(t-butylperoxy)hexane and 2,5-dimethyl-2,5-bis(t-butylperoxy)hexyne-3 are preferable.

The radical initiator is used in an amount of 0.02 to 3 parts by weight, preferably 0.05 to 1 part by weight, per 100 parts by weight of the olefinic elastomer. Below 0.02 parts by weight the crosslinking will be undesirably insufficient, whereas even above 3 parts by weight physical properties of the composition will not be improved any more.

Preferable crosslinking promoter for use in the present invention include, for example, divinylbenzene, triallyl isocyanulate, triallyl cyanurate, diacetone diacrylamide, polyethyleneglycol diacrylate, polyethyleneglycol dimethacrylate, trimethylolpropane trimethacrylate, trimethylolpropane triacrylate, ethyleneglycol dimethacrylate, triethyleneglycol dimethacrylate, diethyleneglycol dimethacrylate, diisopropenylbenzene, p-quione dioxime, p,p-dibenzoylquinone dioxime, phenyl maleimide, allyl methacrylate, N,N'-m-phenylene bismaleimide, diallyl phthalate, tetraallyloxyethane, 1,2-polybutadiene, etc. A plurality of the crosslinking promoters can be used in combination.

The crosslinking promoter is used in an amount of 0.1 to 5 parts by weight, preferably 0.5 to 2 parts by weight, per 100 parts by weight of the olefinic elastomer. Below 0.1 part by weight the crosslinking will be undesirably insufficient, whereas even above 5 parts by weight physical properties of the composition will not be improved any more, while leaving the crosslinking promoter in excess.

Hardness of the present thermoplastic elastomer composition is preferably not more than 90 in terms of surface hardness Type A set forth according to ASTM D2240. When the hardness exceeds 90, the flexibility of the composition will be undesirably insufficient.

It is desirable that the present thermoplastic elastomer composition has such a morphology as to establish the following relation (C) between a matrix region ratio M (%) and a surface hardness H:

$$0.8H - 47 \leq M \leq 0.8H - 34 \qquad (C)$$

where the matrix region ratio M (%) can be determined in the following manner:

The composition is kept at −60° C. and then sliced by a microtome to obtain a 75 nm-thick slice. The slice is left standing overnight to stain it in vapors generated by adding 5 ml of a sodium hypochlorite solution to 0.1 g of ruthenium trichloride. Then, five 5,000-magnified pictures of the slice is taken by a transmission electron microscope, while changing the picture-taking position. Area ratio of stained regions (matrix region) to unstained regions is obtained by an image processor to determine a ratio of matrix regions to the entire image M (%). An average of ratios at the 5 picture-taking positions is made an M value.

Surface hardness is a value measured according to ASTM D2240 in terms of surface hardness Type A set forth therein.

When each of the physical property parameters is within the above-mentioned range, the composition will have an appropriate melt flowability as a thermoplastic elastomer, together with distinguished compression set, rubber characteristics such as impact resilience, etc. and an unexpected distinguished balance between the molding processability and physical properties.

Furthermore, the present thermoplastic elastomer composition can contain other resins and elastomers to such a degree as not to deteriorate the characteristics. Such other resins and elastomers include a block copolymer comprising polymer block A composed mainly of at least one vinyl aromatic compound and a polymer block B composed mainly of at least one conjugated diene compound, a block copolymer obtained by hydrogenation of the former block copolymer and a low molecular weight ethylenic polymer.

It is particularly preferable to add a block copolymer comprising a polymer block A composed mainly of at least one vinyl aromatic compound and a polymer block B composed mainly of at least one conjugated diene compound or a block copolymer obtained by hydrogenation of the former block copolymer to the olefinic elastomer, thereby enabling a drastic increase in oil retainability.

The present block copolymer takes such a structure as A-B, A-B-A, B-A-B-A, A-B-A-B-A, B-A-B-A-B, $(A-B)_4Si$, $(B-A-B)_4Si$, $(B-A-B)_4Sn$ or the like.

The polymer block composed mainly of at least one vinyl aromatic compound means a copolymer block of a vinyl aromatic compound and a conjugated diene compound containing at least 50% by weight of the vinyl aromatic compound and/or a vinyl aromatic homopolymer block.

The polymer block composed mainly of at least one conjugated diene compound means a copolymer block of a conjugated diene compound and a vinyl aromatic compound containing at least 50% by weight of the conjugated diene compound and/or a conjugated diene compound homopolymer block.

The vinyl aromatic compound for use to constitute the block copolymer is at least one compound selected from the group consisting of styrene, methylstyrene, 1,3-dimethylstyrene, p-tert-butylstyrene, etc. Above all, styrene is preferable.

The conjugated diene compound for use to constitute the block copolymer is at least one of butadiene, isoprene, 1,3-pentadiene, 2,3-dimethyl-1,3-butadiene, etc. Above all, butadiene, isoprene and a combination thereof are preferable.

The block copolymer can be produced by any well known method, for example, by block copolymerizing a vinyl aromatic compound with a conjugated diene compound in a hydrocarbon solvent, using a polymerization initiator such as an organic lithium compound, etc.

The hydrogenated block copolymer can be obtained by hydrogenating the above-mentioned block copolymer. The hydrogenation can be carried out by any well known method, for example, by hydrogenation in the presence of a hydrogenation catalyst in an inert solvent. The hydrogenation conditions are so selected as to enable hydrogenation of at least 80%, preferably at least 90%, of the diene compound and also as to enable hydrogenation of less than 20%, preferably less than 10%, of the vinyl aromatic compound.

The block copolymer having the above-mentioned structure has a number-average molecular weight of 20,000 to 300,000, preferably 30,000 to 200,000.

The present block copolymer has good mechanical characteristics as an elastomer, a high oil retainability and such a characteristic as a susceptibility to crosslinking by a radical initiator. Thus, by involvement of a block copolymer as one component the present composition can retain much oil for rubber and can readily provide a low hardness composition. In the dynamic crosslinking reaction, the block copolymer can act as a crosslinkable elastomer component together with the olefinic elastomer.

The block copolymer can be used in a ratio of 0 to 100 parts by weight per 100 parts by weight of the olefinic elastomer. Above 100 parts by weight, the crosslinkability of the composition will be undesirably lowered.

By adding a low molecular weight ethylenic polymer having a number-average molecular weight of not more than 20,000 to the composition, the molding processability of the composition and the skin surface of molded products can be considerably improved. Thus, such addition is preferable.

The low molecular weight ethylenic polymer for use in the present invention is a polymer having a number-average molecular weight of not more than 20,000. The polymer species includes, for example, polyethylene, ethylene-α-olefin copolymer, ethylene-vinyl ester copolymers such as ethylene-vinyl acetate copolymer, etc., ethylene-unsaturated carboxylic acid esters such as ethylene-ethyl acrylate copolymer, etc., ethylene-vinyl alcohol copolymer, etc. Above all, ethylene-α-olefin copolymer has a good flexibility and has no adverse effect on the physical properties of the elastomer composition and thus is suitable for use in the present invention, where α-olefins having 3 to 12 carbon atoms are preferable.

The number-average molecular weight can be calculated by GPC. GPC apparatus and its measuring procedure are the same as used in the determination of the molecular weight distribution of olefinic elastomer as mentioned before. The present number-average molecular weight is derived by multiplying the numerical value obtained under these conditions by a polyethylene conversion factor (0.43).

The low molecular weight ethylenic polymer is well compatible with an olefinic elastomer and can adjust the degree of crosslinking of an olefinic elastomer in the present dynamic crosslinking reaction atmosphere, depending on the amount of added ethylenic polymer, without any considerable decrease in the flowability. That is, by changing an amount of added low molecular weight ethylenic polymer in a range of 0 to 100 parts by weight per 100 parts by weight of the olefinic elastomer, the degree of crosslinking of olefinic elastomer can be adjusted to 30–100% on the basis of the weight of used olefinic elastomer. Above 100 parts by weight, the mechanical strength of the elastomer composition will be undesirably lowered.

Furthermore, the present composition can contain the following polymers to such a degree as not to deteriorate the characteristics of the composition, for example, polyethylene, polybutene, polyisobutene, ethylene-vinyl ester copolymers such as ethylene-vinyl acetate copolymer, etc., ethylene-unsaturated carboxylic acid ester copolymers such as ethylene-ethyl acrylate copolymer, etc., ethylene-vinyl alcohol copolymer, etc.

Furthermore, the present thermoplastic elastomer composition can contain an inorganic filler, a plasticizer and/or any other additives to such a degree as not to deteriorate the characteristics of the composition. Inorganic fillers for use in the present invention include, for example, calcium carbonate, magnesium carbonate, silica, carbon black, glass fibers, titanium oxide, clay, mica, talc, magnesium hydroxide, aluminum hydroxide, etc. Plasticizers include, for example, polyethyleneglycol, phthalic acid esters such as dioctyl phthalate (DOP), etc. Other additives for use in the present invention include, for example, organic and inorganic pigments, a heat stabilizer, an antioxidant, an ultraviolet absorber, a photo stabilizer, a flame retardant, silicone oil, an antiblocking agent, a foaming agent, an antistatic agent, an antibacterial agent, etc.

For the production of the present thermoplastic elastomer composition, ordinary apparatuses for use in the production of ordinary resin compositions or elastomer compositions such as a banbury mixer, a kneader, a single screw extruder, a double screw extruder, etc. can be used. Particularly, a double screw extruder is preferable. The double screw extruder can uniformly and finely disperse olefinic elastomer and propylenic polymer and can conduct crosslinking reaction upon further addition of other components thereto and thus is more preferable for continuous production of the present thermoplastic elastomer composition.

The olefinic elastomer and propylenic polymer for use in the present invention are preferably in such a finely divided form as pellets, powders, crumbs, etc.

The present thermoplastic elastomer composition can be produced specifically through the following processing steps:

That is, the olefinic elastomer and the propylenic polymer are well mixed and then charged into the hopper of an extruder. A radical initiator and a crosslinking promoter can be added from the beginning together with the olefinic elastomer and the propylenic polymer or added to the extruder at the half-way point. Oil for rubber may be added to the extruder at the half-way point or divisionally at the beginning and the half-way point. The olefinic elastomer and the propylenic polymer may be partially added to the extruder at the half-way point. During the heat melting and kneading in the extruder, the elastomer, radical initiator and crosslinking promoter undergo crosslinking reaction, and upon addition of the oil for rubber thereto, followed by melting and kneading, the crosslinking reaction and kneading dispersion can be thoroughly carried out. Then, the kneaded product is withdrawn and pelletized, thereby obtaining pellets of the present thermoplastic elastomer composition.

Degree of crosslinking as a measure for crosslinkability of the composition can be defined as follows: 0.5 g of the present thermoplastic elastomer composition is refluxed in 200 ml of xylene for 4 hours. The solution is filtered through a filter paper for quantitative determination, and the residues on the filter paper are vacuum dried and quantitatively determined. Ratio (%) by weight of the residues to the olefinic elastomer in the composition is calculated as a degree of crosslinking.

Preferable degree of crosslinking of the present thermoplastic elastomer composition is at least 30%. Below 30% the crosslinking is insufficient, so that the heat resistance such as compression set, etc. and physical properties such as impact resilience, etc. will be lowered.

From the thus obtained thermoplastic elastomer composition various molding products can be produced by any molding method. For the production of molding products an injection molding, extrusion molding, compression molding, blow molding, calender molding, foaming molding, etc. can be preferably used.

The present invention will be further described in detail below, referring to Examples, but will not be limited thereto.

Testing procedures used for evaluation of physical properties in the following Examples and Comparative Examples are as follows:

(1) Surface hardness: Four 2 mm-thick sheets were laid one upon another and evaluated in 23° C. atmosphere of Type A according to ASTM D2240.

(2) Breaking tensile strength (kgf/cm$^2$): evaluation at 23° C. according to JIS K6251.

(3) Tensile elongation at break (%): evaluation at 23° C. according to JIS K6251.

(4) Compression set (C-Set) (%): evaluation at 70° C.×22 hours according to JIS K6301.

(5) Percent environment-caused deterioration resistance retainability (%): a 2 mm-thick compression-molded sheet was exposed continuously for 150 hours to black panel temperature of 63° C. and raining time of 18 minutes/irradiation times of 120 minutes according to ASTM D1499, using a carbon arc-type, sunshine weathermeter (made by Suga Testing Machine Co., Ltd.) and evaluated in terms of a percent tensile strength retainability (%).

(6) Oil bleed: a sample obtained just after the molding was left standing in the 23° C. atmosphere for one week and the state of oil coming out onto the surface was visually evaluated with the following marks:

o:no oil bleed, Δ:slight oil bleed and x:obvious oil bleed.

(7) Impact resiliency (%): measurement at 23° C. by a tripsometer.

For preparing thermoplastic elastomer compositions of Examples and Comparative Examples, the following materials were used. Among the olefinic elastomers, characteristics of (a-1) to (a-4) are summarized in Table 1.

TABLE 1

| Elastomer | Unit | (a-1) | (a-2) | (a-3) | (a-4) |
|---|---|---|---|---|---|
| α-Olefin | | octene-1 | octene-1 | octene-1 | octene-1 |
| Polymerization catalyst | | Metallocene | Metallocene | Metallocene | Metallocene |
| Trade name | | Engage 8180 | Engage 8100 | Engage 8445 | — |
| Copolymerization ratio | wt. % | 28 | 24 | 9.5 | 35 |
| Density | g/cm$^3$ | 0.863 | 0.870 | 0.910 | 0.880 |
| Suitability to relation (a) | | ◯ | ◯ | ◯ | X |
| Mw/Mn | | 2.4 | 2.3 | 2.7 | 2.6 |
| Long chain branch | | Yes | Yes | Yes | None |
| MI | g/10 min | 0.5 | 1.0 | 3.5 | 0.5 |
| DSC melting point peak | | Yes | Yes | Yes | Yes |
| Crosslinking time (Tc 90) | sec. | 168 | 315 | 665 | 132 |
| Loss tangent (t) | | 0.04 | 0.04 | 0.07 | 0.04 |
| Surface hardness | Type A | 65 | 75 | 96 | 78 |
| Breaking tensile strength | kgf/cm$^3$ | 93 | 101 | 227 | 48 |
| Tensile elongation at break | % | 820 | 800 | 770 | 430 |

Component (a-1): Olefinic elastomer
Ethylene-octene-1 copolymer,
Engage 8180 available from Dupont-Dow Elastomers Co., Ltd.
Polymerization catalyst: metallocene
α-Olefin copolymerization ratio: 28 wt. %
Density: 0.863 g/cm$^3$
Mw/Mn=2.4
ASTM D1238 melt index: 0.5
ASTM D2240 hardness (Type A): 65
Component (a-2): Olefinic elastomer
Ethylene-octene-1 copolymer, Engage 8100 available from Dupont-Dow Elastomers Co., Ltd.

Polymerization catalyst: metallocene
α-Olefin copolymerization ratio: 24 wt. %
Density: 0.870 g/cm³
Mw/Mn=2.3
ASTM D1238 melt index: 1.0
ASTM D2240 hardness (Type A): 75
Component (a-3): Olefinic elastomer
Ethylene-octene-1 copolymer, Engage 8445 available from DuPont-Dow Elastomers Co., Ltd.
Polymerization catalyst: metallocene
α-Olefin copolymerization ratio: 9.5 wt. %
Density: 0.910 g/cm³
Mw/Mn=2.7
ASTM D1238 melt index: 3.5
ASTM D2240 hardness (Type A): 96
Component (a-4): Olefinic elastomer
Ethylene-octene-1 copolymer
Polymerization catalyst: metallocene
α-Olefin copolymerization ratio: 35 wt. %
Density: 0.880 g/cm³
Mw/Mn=2.6
ASTM D1238 melt index: 3.0
ASTM D2240 hardness (Type A): 78
Component (b): ethylene-propylene-diene rubber (EPDM) obtained by polymerization, using a Ziegler catalyst.
Propylene content: 27 wt. %
Diene component: ethylidene norbornene
Diene content: 15 in terms of iodine value
ASTM D1238 melt index: 2
ASTM D2240 hardness (Type A): 65
Component (c-1): block copolymer
Styrene-butadiene block copolymer having an A-B-A structure, a styrene content of 20 wt. %, a number-average molecular weight of 51,000, and a polybutadiene hydrogenation ratio of 99%.
ASTM D1238 melt index: 12
ASTM D2240 hardness (Type A): 67
Component (c-2): block copolymer
Styrene-isoprene block copolymer having an A-B-A structure, a styrene content of 20 wt. %, a number-average molecular weight of 53,000 and a polyisoprene hydrogenation ratio of 99%.
ASTM D1238 melt index: 13
ASTM D2240 hardness (Type A): 66
Component (d-1): low molecular weight ethylene-propylene copolymer
Number-average molecular weight: 18,000
Propylene content: 22 wt. %
Component (d-2): low molecular weight ethylene-octene copolymer
Number-average molecular weight: 16,000
Octene content: 24 wt. %
Component (e): propylenic polymer
Isotactic polypropylene resin MA2 available from Japan Polychem Co., Ltd.
ASTM D1238 melt index: 15
Component (d): paraffinic oil
Diana process oil PW-380 available from Idemitsu Kosan Co., Ltd.
Component (g): radical initiator
2,5-dimethyl-2,5-bis(t-butylperoxy)hexane Trade name: Perhexa 25B (made by NOF corporation)
Component (h): crosslinking promoter
Divinylbenzene

EXAMPLES 1 TO 8 AND COMPARATIVE EXAMPLES 1 TO 6

A double screw extruder (40 mm in diameter, L/D=47) having an injection hole at the barrel center was used as an extruder. Screws were double thread screws having a kneading section extending over the injection hole.

Pellets of olefinic elastomer and propylenic polymer, as shown in Table 1 were well blended and then charged into the hopper of the double screw extruder (cylinder temperature: 220° C.). Predetermined amounts of radial initiator and crosslinking promoter were injected into the extruder through the injection hole at the center by a pump. The materials were kneaded with heating, crosslinked and pelletized to obtain composition pellets. The resulting composition pellets were again charged into the hopper of the double screw extruder (cylinder temperature: 220° C.). A predetermined amount of oil was injected into the extruder through the injection hole at the center by a pump. The mixture was kneaded with heating and pelletized to obtain elastomer composition pellets of the present invention.

Only in Example 4, processing was carried out in the following manner: pellets of olefinic elastomer and propylenic polymer were well blended together with predetermined amounts of radical initiator and cross-linking promoter and then charged into the hopper of the double screw extruder (cylinder temperature: 220°). A predetermined amount of oil was injected into the extruder through the injection hole at the center by the pump. The mixture was kneaded with heating and pelletized to obtain pellets of the elastomer composition of the present invention.

From the thus obtained elastomer compositions were prepared 2 mm-thick sheets by compression molding at 200° C. to evaluate various mechanical characteristics and environment-caused deterioration resistance.

Results are shown in Tables 2 and 3.

TABLE 2

| Composition Component and Physical Properties | Unit | Example | | | | Comparative Example | | | | | |
|---|---|---|---|---|---|---|---|---|---|---|---|
| | | 1 | 2 | 3 | 4 | 1 | 2 | 3 | 4 | 5 | 6 |
| Component (a-1) | Parts by weight | 100 | 100 | 100 | 100 | — | — | — | — | 100 | 100 |
| Component (a-2) | Parts by weight | — | — | — | — | 100 | — | — | — | — | — |

TABLE 2-continued

| Composition Component and Physical Properties | Unit | Example 1 | 2 | 3 | 4 | Comparative Example 1 | 2 | 3 | 4 | 5 | 6 |
|---|---|---|---|---|---|---|---|---|---|---|---|
| Component (a-3) | Parts by weight | — | — | — | — | — | 100 | — | — | — | — |
| Component (a-4) | Parts by weight | — | — | — | — | — | — | 100 | — | — | — |
| Component (b) | Parts by weight | — | — | — | — | — | — | — | 100 | — | — |
| Component (e) | Parts by weight | 35 | 35 | 35 | 35 | 35 | 35 | 35 | 35 | 35 | 35 |
| Component (f) | Parts by weight | 80 | 70 | 60 | 70 | 80 | 50 | 100 | 80 | 60 | 60 |
| Component (g) | Parts by weight | 0.3 | 0.3 | 0.3 | 0.3 | 0.3 | 0.3 | 0.3 | 0.3 | 0.01 | — |
| Component (g) | Parts by weight | 1 | 1 | 1 | 1 | 1 | 1 | 1 | 1 | — | — |
| Surface hardness | | 67 | 71 | 74 | 69 | 70 | 94 | 71 | 68 | 61 | 60 |
| Breaking tensile strength | kgf/cm$^2$ | 62 | 70 | 82 | 63 | 68 | 178 | 34 | 52 | 66 | 96 |
| Tensile elongation at break | % | 330 | 350 | 370 | 340 | 320 | 590 | 210 | 300 | 960 | 980 |
| Compression set | % | 37 | 39 | 42 | 33 | 40 | 71 | 42 | 36 | 99 | -*) |
| Degree of crosslinking | % | 74 | 77 | 79 | 82 | 72 | 51 | 71 | 78 | 6 | 0 |
| Environment-caused deterioration resistance retainability | % | 92 | 93 | 96 | 95 | 95 | 96 | 94 | 79 | -*) | -*) |
| Oil bleed | | ○ | ○ | ○ | ○ | X | X | Δ | ○ | ○ | ○ |
| Impact resiliency | % | 59 | 56 | 54 | 57 | 54 | 38 | 49 | 46 | 61 | 67 |
| Suitability to relation (C) | % | ○ | ○ | ○ | ○ | ○ | ○ | ○ | ○ | ○ | ○ |

*) failure to measure due to sample shape change

TABLE 3

| Composition Component and physical properties | Unit | Example 5 | 6 | 7 | 8 |
|---|---|---|---|---|---|
| Component (a-1) | Parts by weight | 100 | 100 | 100 | 100 |
| Component (c-1) | Parts by weight | 30 | — | — | — |
| Component (c-2) | Parts by weight | — | 40 | — | — |
| Component (d-1) | Parts by weight | — | — | 30 | — |
| Component (d-2) | Parts by weight | — | — | — | 30 |
| Component (e) | Parts by weight | 40 | 40 | 35 | 35 |
| Component (f) | Parts by weight | 90 | 80 | 70 | 70 |
| Component (g) | Parts by weight | 0.4 | 0.4 | 0.5 | 0.5 |
| Component (h) | Parts by weight | 1.3 | 1.3 | 1 | 1 |
| Surface hardness | | 66 | 68 | 68 | 67 |
| Breaking tensile strength | kgf/cm$^2$ | 63 | 71 | 63 | 64 |
| Tensile elongation at break | % | 360 | 380 | 340 | 360 |
| Compression set | % | 33 | 32 | 38 | 37 |
| Degree of crosslinking | % | 65 | 76 | 61 | 58 |
| Environment-caused deterioration resistance retainability | % | 92 | 92 | 91 | 92 |
| Oil bleed | | ○ | ○ | ○ | ○ |
| Impact resiliency | % | 56 | 54 | 57 | 58 |
| Suitability to relation (C) | % | ○ | ○ | ○ | ○ |

As is obvious from the results shown in Tables 2 and 3, the present thermoplastic elastomer compositions have good mechanical characteristics and environment-caused deterioration resistance without any oil bleed.

The composition of Comparative Example 1 has a low α-olefin copolymerization ratio of olefinic elastomer and a poor oil bleed resistance, as compared with the composition of Example 1 having the same composition ratio. The composition of Comparative Example 2 has a low α-olefin copolymerization ratio of olefinic elastomer and a high density and is hard to obtain a low hardness composition free from oil bleed. The composition of Comparative Example 3 fails to satisfy the relation (a) between the copolymerization ratio and the density and also fails to have the satisfactory tensile strength and overcome the oil bleed problem. The composition of Comparative Example 4 has a composition containing EPDM, but is poor in the environment-caused deterioration resistance, as compared with the composition of Example 1 having the same composition ratio. The composition of Comparative Example 5 is a system using a very small amount of a radical initiator, but the crosslinking is not satisfactory with poor compression set and environment-caused deterioration resistance. The composition of Comparative Example 6 using no radical initiator has a poor heat resistance and low compression set and environment-caused deterioration resistance. When tubular molded products were made from the compositions of Examples 7 and 8 of Table 3 by an extrusion molding machine (extrusion temperature: 220° C.), good molded products having smooth surfaces could be obtained.

Industrial Utilization

The present thermoplastic elastomer composition is distinguished in physical properties such as environment-caused deterioration resistance, etc., and has well balanced mechanical properties, as compared with the conventional compositions using EPDM, etc., and its utility is very large. Particularly, it has no fear of oil bleed as a low hardness composition and can be effectively utilized in the industries. The present thermoplastic elastomer composition can be widely used in the fields of automobile parts, automobile interior finishing materials, air bag covers, mechanical parts, electrical parts, cables, hoses, belts, toys, sundries, daily necessities, building materials, sheets, films, etc.

What is claimed is:

1. An olefinic thermoplastic elastomer composition, which comprises a mixture comprising:
    (1) 100 parts by weight of an olefinic elastomer comprising ethylene and at least one α-olefin having 6 to 12 carbon atoms, and having an α-olefin copolymerization ratio of 26 to 30% by weight, a density of 0.8 to 0.9 g/cm$^3$ and a molecular weight distribution (Mw/Mn) of less than 3.0 in terms of a ratio of weight-average molecular weight (Mw) to number-average molecular weight (Mn) calculated by gel permeation chromatography (GPC),
    (2) 5 to 90 parts by weight of a propylynic polymer, and
    (3) 5 to 250 parts by weight of an oil for rubber, the mixture being crosslinked by a radical initiator or both of a radical initiator and a crosslinking promoter.

2. An olefinic thermoplastic elastomer composition according to claim 1, wherein the olefinic elastomer is produced with a metallocene catalyst.

3. An olefinic thermoplastic elastomer composition according to claim 1, wherein the α-olefin of the olefinic elastomer is octene-1.

4. An olefinic thermoplastic elastomer composition according to claim 1, wherein the olefinic elastomer has a long chain branch.

5. An olefinic thermoplastic elastomer composition according to claim 1, wherein the following relation (a) is established between the olefinic elastomer copolymerization ratio C (wt. %) and the density ρ (g/cm$^3$):

$$-0.0026 \times c + 0.9200 \leq \rho \leq -0.0026 \times c + 0.9400 \tag{a}$$

6. An olefinic thermoplastic elastomer composition according to claim 1, wherein crosslinking time (Tc 90) of the olefinic elastomer is not more than 400 seconds.

7. An olefinic thermoplastic elastomer composition according to claim 1, where the olefinic elastomer has a DSC melting peak point.

8. An olefinic thermoplastic elastomer composition according to claim 1, wherein a loss tangent t (23° C.) in dynamic viscoelastic characteristics of the olefinic elastomer satisfies the following relation (b):

$$0.03 \leq t \leq 0.08 \tag{b}$$

9. An olefinic thermoplastic elastomer composition according to claim 1, wherein the composition has such a morphology as to establish the following relation (c) between a matrix region ratio M (%) and a surface hardness H:

$$0.8H - 47 \leq M \leq 0.8H - 34 \tag{c}$$

10. An olefinic thermoplastic elastomer composition according to claim 1, wherein a block copolymer comprising a copolymer block A composed mainly of at least one vinyl aromatic compound and a polymer block B composed mainly of at least one conjugated diene compound or a block copolymer obtained by further hydrogenation of the former-block copolymer is further contained therein.

11. An olefinic thermoplastic elastomer composition according to claim 1, wherein a low molecular weight ethylenic polymer having a number-average molecular weight of not more than 20,000 is further contained therein.

12. An olefinic thermoplastic elastomer composition according to claim 1, wherein the composition has a surface hardness Type A of not more than 90 set forth according to ASTM D2240.

13. An olefinic thermoplastic elastomer composition according to claim 1, wherein the composition has a degree of crosslinking of at least 30.

* * * * *